(12) United States Patent
Maeno et al.

(10) Patent No.: US 8,072,662 B2
(45) Date of Patent: Dec. 6, 2011

(54) BEAM IRRADIATION APPARATUS

(75) Inventors: Yoshiaki Maeno, Mizuho (JP); Atsushi Yamaguchi, Ibi-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 320 days.

(21) Appl. No.: 12/500,407

(22) Filed: Jul. 9, 2009

(65) Prior Publication Data

US 2010/0014139 A1 Jan. 21, 2010

(30) Foreign Application Priority Data

Jul. 15, 2008 (JP) .................. 2008-184324

(51) Int. Cl.
*G02B 26/08* (2006.01)
*G01C 3/08* (2006.01)

(52) U.S. Cl. .................. 359/198.1; 250/206.1; 356/4.01

(58) Field of Classification Search .............. 359/197.1, 359/199.3, 200.1, 200.7, 201.1, 203.1, 204.1, 359/206.1, 209.1; 250/559.29, 559.32, 559.38, 250/206.1, 206.2, 235; 356/4.01, 5.01, 5.02, 356/5.05
See application file for complete search history.

(56) References Cited

U.S. PATENT DOCUMENTS

| | | | | |
|---|---|---|---|---|
| 5,281,812 A * | 1/1994 | Lee et al. | ...................... | 250/235 |
| 7,092,075 B2 * | 8/2006 | Singh et al. | .................. | 356/4.01 |
| 7,576,838 B2 * | 8/2009 | Shirai | .............................. | 356/28 |
| 2010/0073664 A1 * | 3/2010 | Krasutsky | .................... | 356/4.01 |

FOREIGN PATENT DOCUMENTS

JP   1183988 A   3/1999

* cited by examiner

*Primary Examiner* — Frank Font
(74) *Attorney, Agent, or Firm* — Ditthavong Mori & Steiner, P.C.

(57) ABSTRACT

A beam irradiation apparatus includes: an actuator which scans a target region with a laser beam; a photodetector which receives a servo beam and outputs a signal according to a beam reception position; an optical unit which makes the servo beam displaced on the photodetector in association with driving of the actuator; and a position signal generation circuit that generates a signal according to the reception position of the servo beam based on an output signal from the photodetector. The position signal generation circuit has a signal removal circuit that removes a disturbance signal generated when the laser beam is incident on the photodetector, from an output signal of the photodetector.

5 Claims, 12 Drawing Sheets

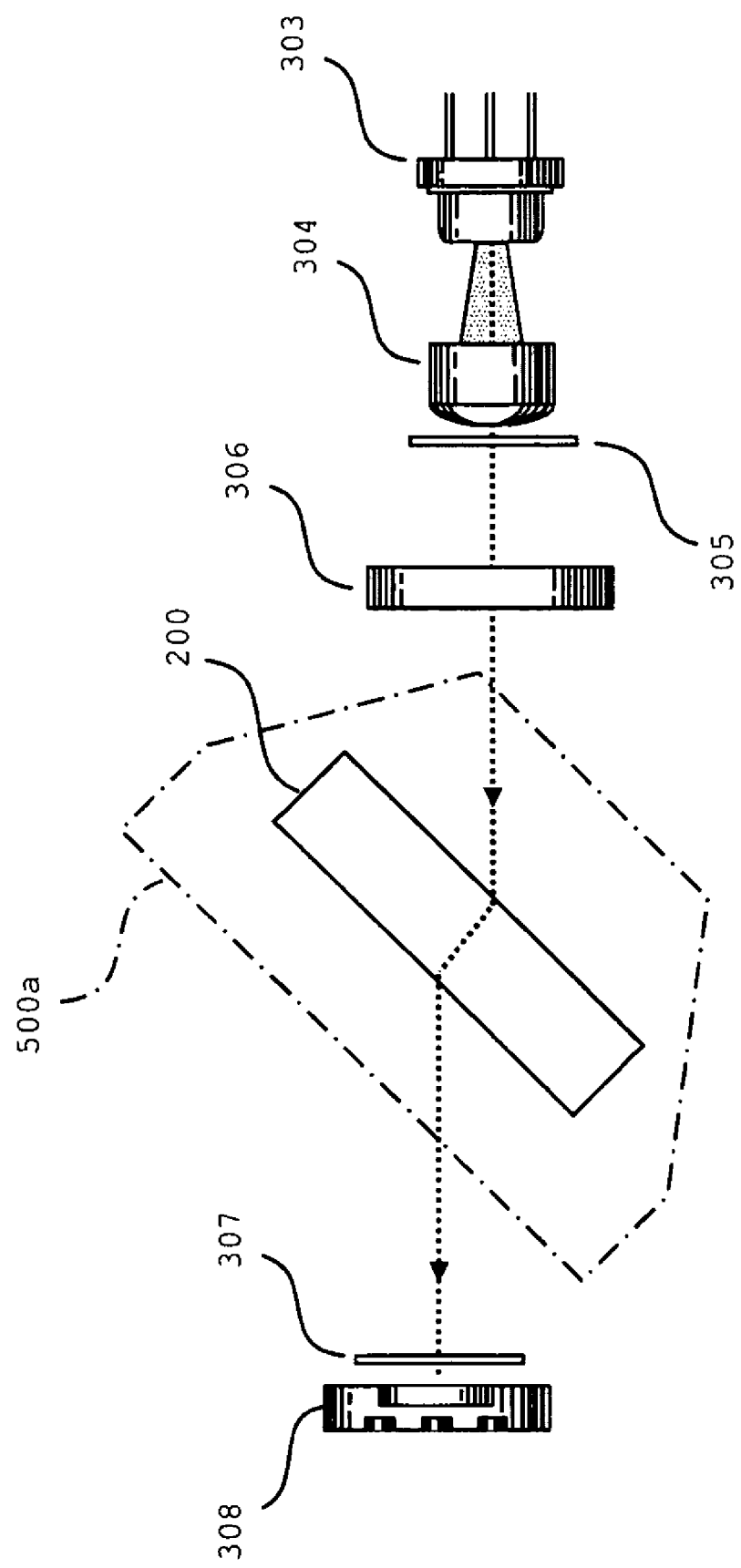

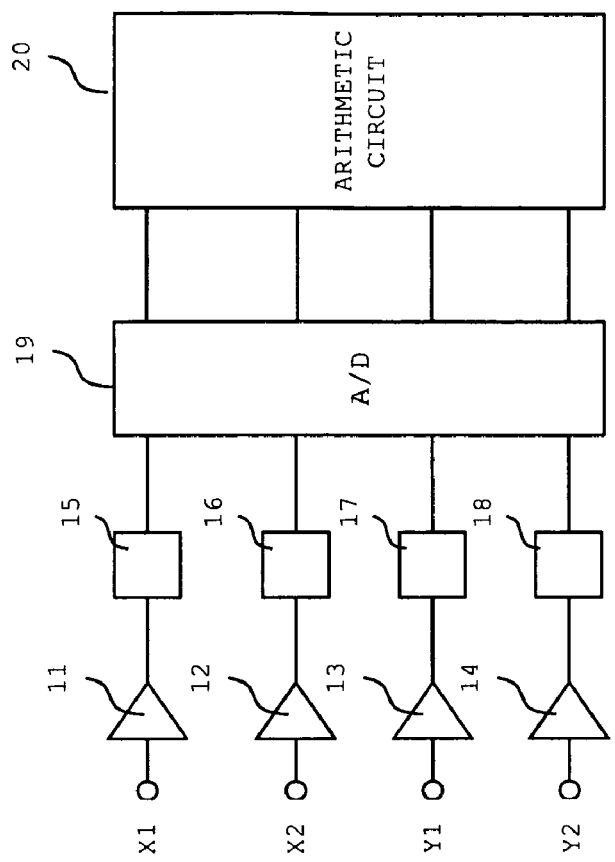
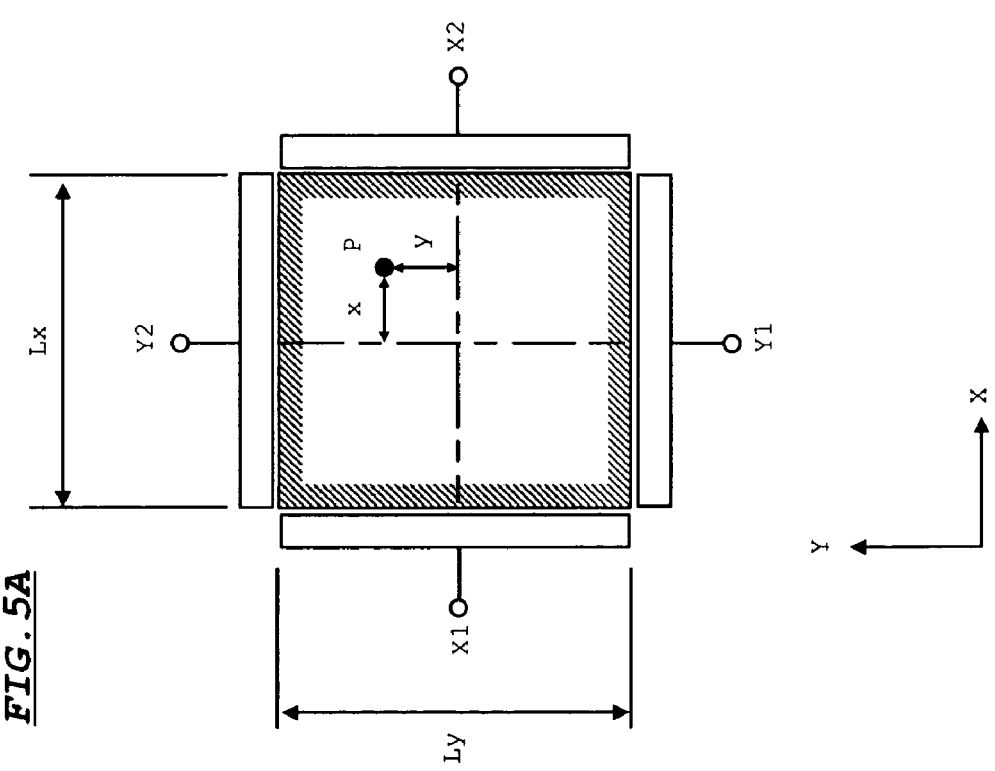
FIG. 5B
FIG. 5A

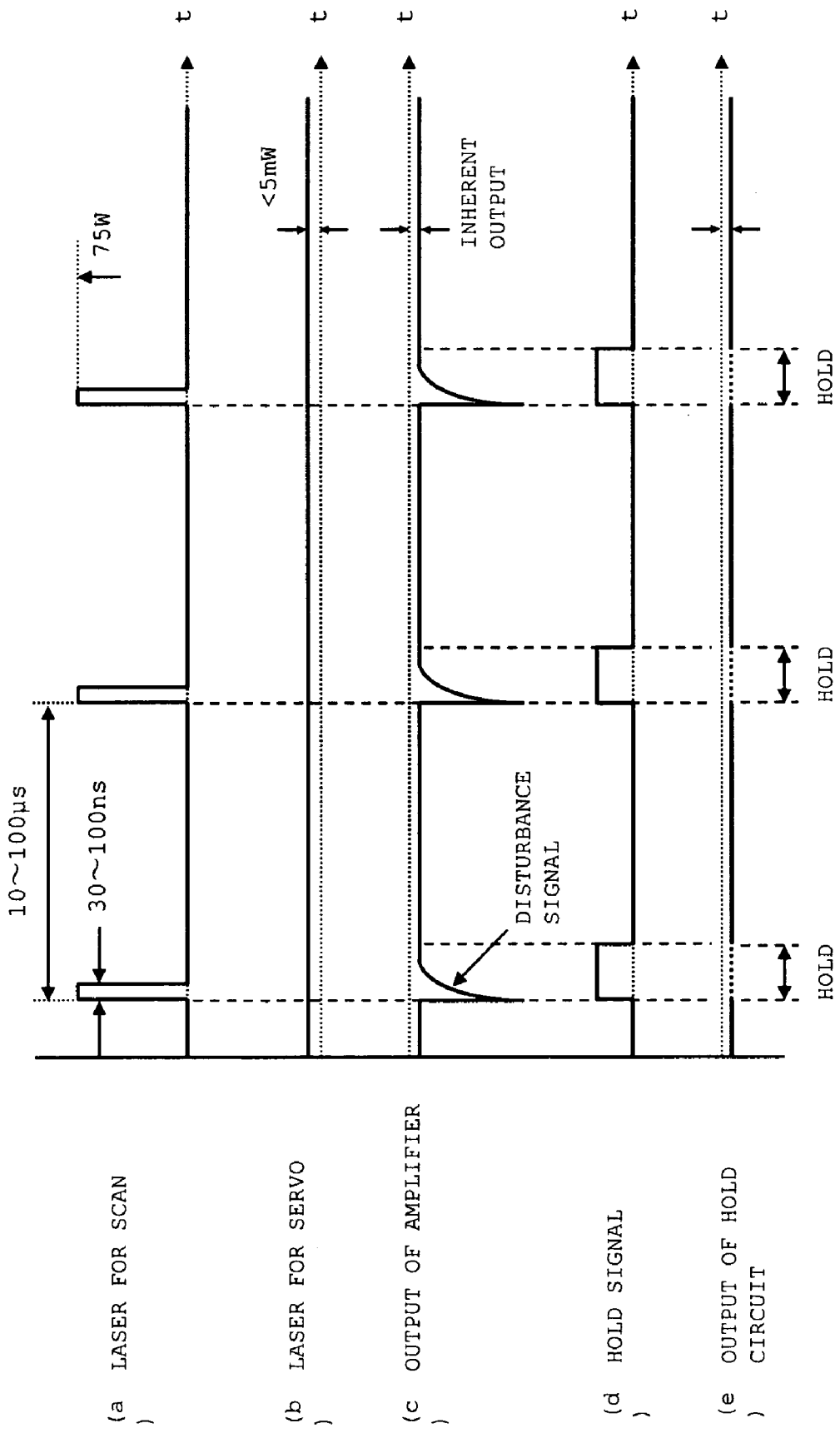

BEAM IRRADIATION APPARATUS

This application claims priority under 35 U.S.C. Section 119 of Japanese Patent Application No. 2008-184324 filed Jul. 15, 2008, entitled "BEAM IRRADIATION APPARATUS". The disclosers of the above applications are incorporated herein by reference.

BACKGROUND OF THE INVENTION

1. Field of the Invention

The present invention relates to a beam irradiation apparatus for irradiating a target region with a laser beam and, particularly, to a beam irradiation apparatus mounted on a so-called laser radar, for detecting the presence or absence of an obstacle in a target region and a distance to an obstacle based on reflection light of a laser beam emitted to a target region.

2. Description of the Related Art

In recent years, a laser radar is mounted on a family car or the like in order to enhance safety during driving. The laser radar emits a laser beam to the front in the driving direction and detects the presence or absence of an obstacle in a target region and distance to an obstacle. Generally, the laser radar scans a target region with a laser beam and, based on the presence or absence of reflection light in each of scanned positions, detects the presence or absence of an obstacle in each of the scanned positions. Further, based on required time from a laser beam emission timing in each scan position to a reflection light reception timing, the distance to the obstacle from the laser radar in the scan position is detected.

To enhance detection precision of a laser radar, a target region has to be properly scanned with a laser beam, and each scan position of a laser beam has to be properly detected. As a laser beam scanning mechanism, a scan mechanism using a polygon mirror and a lens-driving-type scan mechanism for two-dimensionally driving a lens for scan are known.

On the other hand, as a method different from the scan mechanisms, a mirror-turning-type scan mechanism can be proposed. In the scan mechanism, a mirror is supported so as to be driven about two axes. The mirror is turned about each of the drive shafts as an axis by an electromagnetic drive force between a coil and a magnet. A laser beam is obliquely incident on the mirror. By two-dimensionally driving the mirror about each of the drive shafts as an axis, a target region is scanned in the horizontal and vertical directions with reflection light of the laser beam by the mirror.

In the scan mechanisms, scan positions of the laser beam can be detected by, for example, disposing a light source which emits a servo beam in addition to a light source which emits the laser beam and receiving the servo beam by a photodetector such as a PSD (Position Sensing Device) or the like. In this case, a configuration of making the servo beam displaced on the photodetector so as to trace a scan of the laser beam is disposed.

For example, the scan mechanism of the mirror rotating type can employ a configuration of disposing a servo mirror which rotates with a mirror to reflect the laser beam to the target region and making a servo beam incident on the servo mirror. Alternatively, a configuration of disposing a transparent member having a flat plate shape in place of the servo mirror, and making a servo beam incident on the transparent member can be used. In the case where the servo mirror is used, a servo beam reflected by the servo mirror is received by a PSD or the like. In the case where the transparent member is used, a servo beam passed through the transparent member is received by a PSD or the like. When the mirror rotates at the time of a scan with a laser beam, the servo mirror or the transparent member rotates in association with the rotation of the mirror, and the servo beam is displaced on the PSD. Based on an output signal from the PSD, the scan position of the laser beam on the target region can be obtained.

In the beam irradiation apparatus having the above-described configuration, a laser beam is emitted as a pulse beam to the target region at a predetermined timing. In this case, the power of the laser beam emitted toward the target region is remarkably higher than that of a servo beam incident on the PSD (by about 100,000 times). Consequently, when the laser beam is incident on the PSD as ambient light, an output signal from the PSD largely changes, and a problem such that an error is included in the position detection signal occurs. Normally, the wavelength of a servo beam is set so as to be different from that of a laser beam. As described above, the power of the laser beam is remarkably higher than that of the servo beam. Due to this, it is extremely difficult to completely block the PSD from the laser beam with a filter or the like. Even if a filter or the like is used, the laser beam exerts some influence on a position detection signal as ambient light, and a problem such that the precision of the position detection signal deteriorates occurs.

SUMMARY OF THE INVENTION

An object of the present invention is to provide a beam irradiation apparatus realizing increased precision of a position detection signal by suppressing the influence of a laser beam (ambient light) on a position detection signal.

A beam irradiation apparatus as a main aspect of the present invention includes: an actuator which scans a target region with a laser beam; a photodetector which receives a servo beam and outputs a signal according to a beam reception position; an optical unit which makes the servo beam displaced on the photodetector in association with driving of the actuator; and a position signal generation circuit which generates a signal according to the reception position of the servo beam based on an output signal from the photodetector. The position signal generation circuit has a signal removal circuit that removes a disturbance signal generated when the laser beam is incident on the photodetector, from an output signal of the photodetector.

BRIEF DESCRIPTION OF THE DRAWINGS

The above and further objects and novel features of the invention will more fully appear from the following description when the same is read with reference to the accompanying drawings:

FIG. 3 shows the optical system of the beam irradiation apparatus in the embodiment.

FIGS. 5A and 5B are diagrams for explaining a method of generating a position detection signal in the embodiment.

FIG. 12 is a diagram for explaining the action of the position signal generation circuit shown in FIG. 11.

Figure 1:
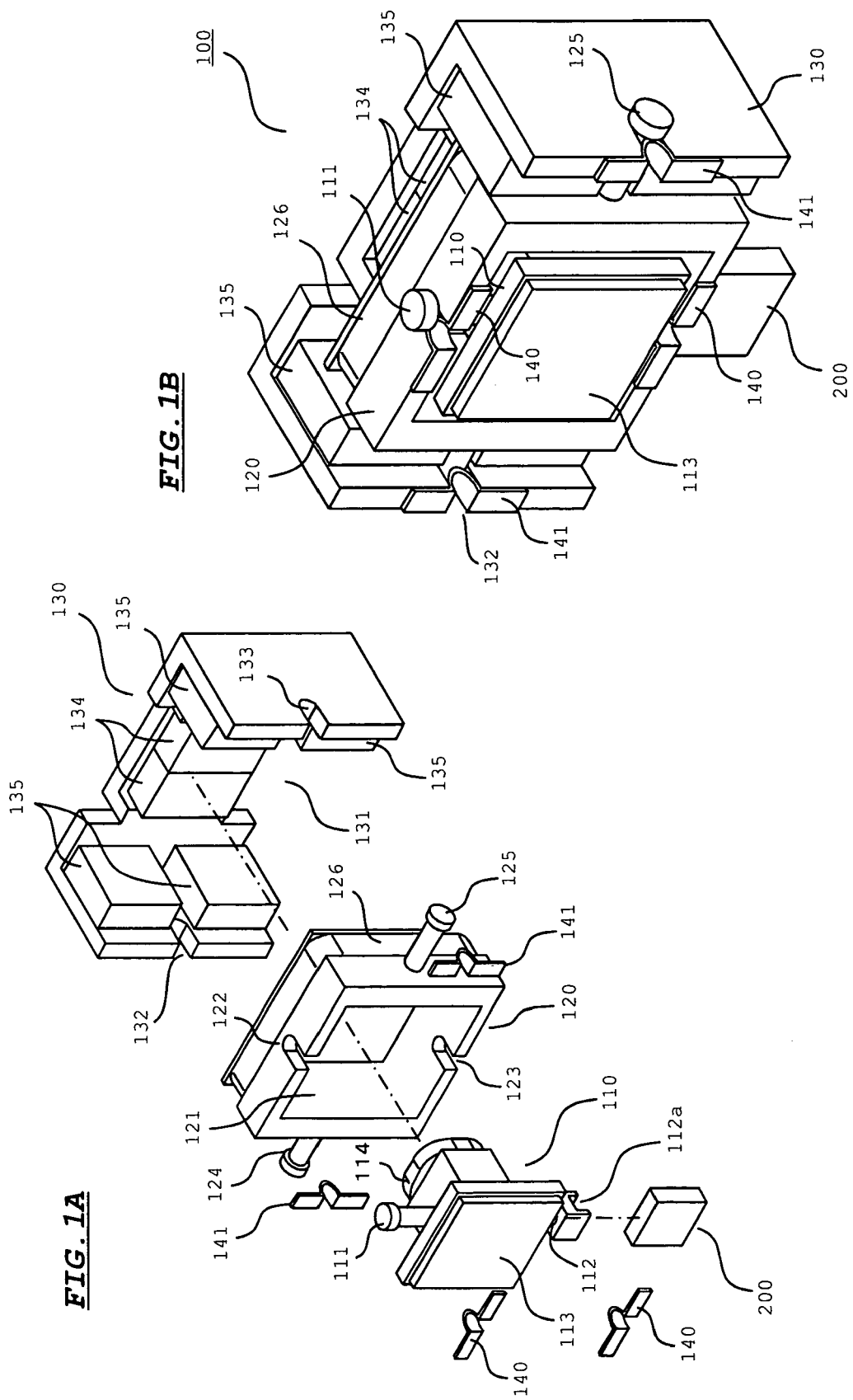
FIGS. 1A and 1B show the configuration of a mirror actuator according to an embodiment.

However, it is to be expressly understood that the drawing is for purpose of illustration only and is not intended as a definition of the limits of the invention.

DESCRIPTION OF THE PREFERRED EMBODIMENTS

An embodiment of the present invention will be described below with reference to the diagrams. In the embodiment, an actuator of a mirror rotating type is used as means for scanning a target region with a laser beam. As a configuration for detecting the rotating position of a mirror, a laser beam source for emitting a servo beam, a transparent member on which the servo beam is incident, and a PSD for receiving the servo beam passed through the transparent member are used.

FIGS. 1A and 1B show the configuration of a mirror actuator 100 according to an embodiment of the present invention. FIG. 1A is an exploded perspective view of the mirror actuator 100, and FIG. 1B is a perspective view of the mirror actuator 100 in an assemble state.

In FIG. 1A, 110 denotes a mirror holder. The mirror holder 110 includes a support shaft 111 having a retainer at its end and a support shaft 112 having a receiving part 112a at its end. A recess having a thickness almost the same as that of a transparent member 200 is formed in the receiving part 112a, and an upper part of the transparent member 200 is attached to the recess. Further, a flat-plate-shaped mirror 113 is attached to the front face of the mirror holder 110, and a coil 114 is attached to the rear face. The coil 114 is wound in a rectangular shape.

To the support shaft 112, the transparent member 200 having the parallel plate shape is attached via the receiving part 112a as described above. The transparent member 200 is attached to the support shaft 112 so that their two planes are parallel to the mirror surface of the mirror 113.

The mirror holder 110 is supported by a movable frame 120 while being rotatable about the support shafts 111 and 112. An opening 121 is formed in the movable frame 120 in order to accommodate the mirror holder 110, and grooves 122 and 123 are also formed in the movable frame 120 in order to engage the support shafts 111 and 112 of the mirror holder 110. Support shafts 124 and 125 having retaining members in end portions thereof are formed in side faces of the movable frame 120, and a coil 126 is attached to a back face of the movable frame 120. The coil 126 is wound in a rectangular shape.

The movable frame 120 is supported by a fixed frame 130 while being rotatable about the support shaft 124 and 125. A recess 131 is formed in the fixed frame 130 in order to accommodate the movable frame 120, and grooves 132 and 133 are also formed in the fixed frame 130 in order to engage the support shaft 124 and 125 of the movable frame 120. Magnets 134 and 135 are attached to an inner surface of the fixed frame 130. The magnets 134 apply a magnetic field to the coil 114, and the magnets 135 apply a magnetic field to the coil 126. The grooves 132 and 133 are extended from the front face of the fixed frame 130 into a gap between the upper and lower magnets 135.

A pressing plate 140 presses the support shafts 111 and 112 from the front side such that the support shafts 111 and 112 of the mirror holder 110 do not drop out from the grooves 122 and 33 of the movable frame 120. A pressing plate 141 presses the support shafts 124 and 125 from the front side such that the support shafts 124 and 125 of the movable frame 120 do not drop out from the grooves 132 and 133 of the fixed frame 130.

In assembling the mirror actuator 100, the support shafts 111 and 112 of the mirror holder 110 are engaged in the grooves 122 and 123 of the movable frame 120, and the pressing plate 140 is attached to the front face of the movable frame 120 while the front faces of the support shafts 111 and 112 are pressed. Therefore, the mirror holder 110 is rotatably supported by the movable frame 120.

After the mirror holder 110 is attached to the movable frame 120, the support shafts 124 and 125 of the movable frame 120 are engaged in the grooves 132 and 133 of the fixed frame 130, and the pressing plate 141 is attached to the front face of the fixed frame 130 while the front faces of the support shafts 132 and 133 are pressed. Therefore, the movable frame 120 is rotatably supported by the fixed frame 130, and the assembly of the mirror actuator 100 is completed.

The mirror 113 is rotated, when the mirror holder 110 is rotated about the support shaft 111 and 112 with respect to the movable frame 120. When the movable frame 120 is rotated about the support shafts 124 and 125 with respect to the fixed frame 130, the mirror holder 110 is rotate, and therefore the mirror 113 is integrally rotated. Thus, the mirror holder 110 is supported in the two-dimensionally rotatable manner by the support shafts 111 and 112 and the support shafts 124 and 125 which are orthogonal each other, and the rotation of the mirror holder 110 rotates the mirror 113 in the two-dimensional direction. At this time, the transparent member 200 attached to the support shaft 112 also rotates in association with the rotation of the mirror 113.

In the assembled state of FIG. 1B, an arrangement and polarities of the two magnets 134 are adjusted such that a rotational force is generated in the mirror holder 110 about the support shafts 111 and 112 by applying an electric current to the coil 114. Accordingly, when the current is applied to the coil 114, the mirror holder 110 is rotated about the support shaft 111 and 112 by an electromagnetic driving force generated in the coil 114.

In the assembled state of FIG. 1B, an arrangement and polarities of the two magnets 135 are adjusted such that a rotational force is generated in the movable frame 120 about the support shafts 124 and 125 by applying a current to the coil 126. Therefore, when current is applied to the coil 126, the movable frame 120 rotates about the support shafts 124 and 125 as axes by an electromagnetic drive force generated in the coil 126 and, in association with the rotation, the transparent member 200 rotates.

Figure 2:
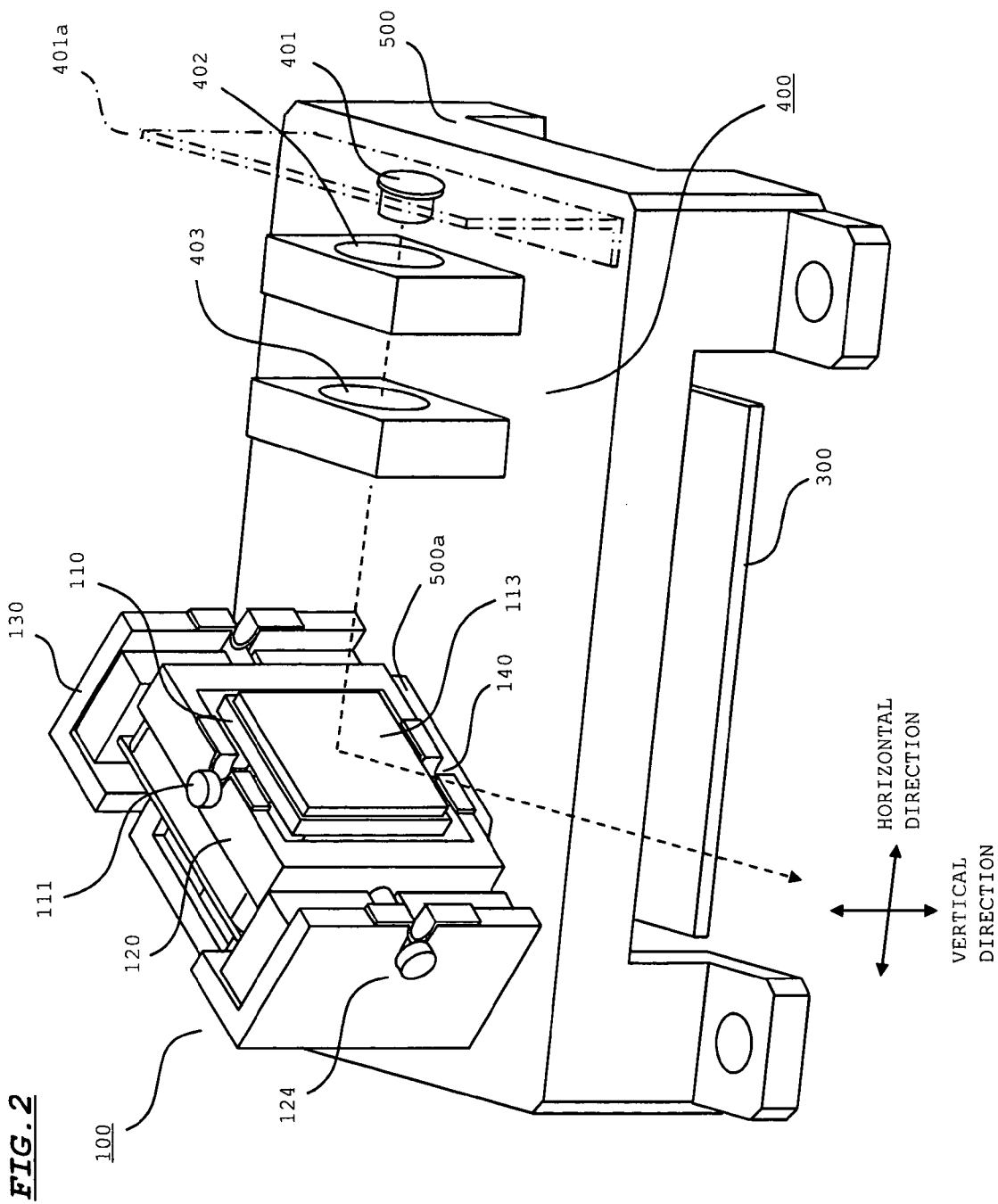
FIG. 2 shows an optical system of a beam irradiation apparatus in the embodiment.

FIG. 2 is a diagram showing the configuration of the optical system in a state where the mirror actuator 100 is attached.

In FIG. 2, 500 denotes a base that supports an optical system. In the base 500, an opening 500a is formed in a position where the mirror actuator 100 is mounted. The mirror actuator 100 is attached on the base 500 so that the transparent member 200 is inserted in the opening 500a.

On the top face of the base 500, an optical system 400 for guiding a laser beam to the mirror 113 is attached. The optical system 400 includes a laser light source 401 and beam shaping lenses 402 and 403. The laser light source 401 is attached to a substrate 401a for the laser light source disposed on the top face of the base 500. A laser beam having an infrared wavelength (850-910 nm) is emitted from the laser light source 401.

A laser beam emitted from the laser light source 401 is subjected to actions of convergence in the horizontal and vertical directions of the lenses 402 and 403. The lenses 402 and 403 are designed so that a beam shape in a target region (which is set, for example, in a position in front of the beam emission port of the beam irradiation apparatus by about 100 m) has a predetermined size (for example, a size of about 2 m in the vertical direction and about 1 m in the horizontal direction).

The lens 402 is a cylindrical lens having the lens effect in the vertical direction, and the lens 403 is an aspheric lens that converts a laser beam to almost parallel beams. The spread angles in the vertical and horizontal directions of the beam emitted from the laser light source are different from each other. The first lens 402 changes the ratio between the spread angles in the vertical and horizontal directions. The second lens 403 changes the magnifications of the spread angles (in both of the vertical and horizontal directions) of the outgoing beam.

The laser beam passed through the lenses 402 and 403 is incident on the mirror 113 of the mirror actuator 100 and is reflected by the mirror 113 toward the target region. The mirror 113 is two-dimensionally driven by the mirror actuator 100, thereby two-dimensionally scanning the target region with the laser beam.

When the mirror 113 is in a neutral position, the mirror actuator 100 is disposed so that a laser beam from the lens 403 is incident on the mirror surface of the mirror 113 at an incident angle of 45 degrees in the horizontal direction. The "neutral position" is a position of the mirror 113 when the mirror surface is parallel to the vertical direction and the laser beam is incident on the mirror surface an incident angle of 45 degrees in the horizontal direction.

A circuit board 301 is disposed below the base 500. Further, also on the rear and side surfaces of the base 500, circuit boards (not shown) are disposed.

FIG. 3 is a diagram showing the configuration of a servo optical system disposed on the rear face side of the base 500. As shown in the diagram, the servo optical system has, in addition to the transparent member 200 projected to the rear face side of the base 500 from the opening 500a, a semiconductor laser 303, a condenser lens 304, an aperture 305, an ND (Neutral Density) filter 306, an IR cut filter 307, and a PSD 308. The transparent member 200 is positioned so that two planes are parallel to the vertical direction and tilt with respect to the axis of light emitted from the semiconductor laser 303 by 45 degrees when the mirror 113 in the mirror actuator 100 is in the neutral position. The IR cut filter 307 is disposed to cut light having infrared wavelength.

A laser beam having a wavelength of about 650 nm (hereinbelow, called "servo beam") is emitted from the semiconductor laser 303. The servo beam emitted from the semiconductor laser 303 is condensed by the condenser lens 304. After that, the beam diameter is narrowed by the aperture 305 and, further, light is decreased by the ND filter 306. The servo beam enters the transparent member 200 and is subject to refraction action by the transparent member 200. The servo beam passed through the transparent member 200 passes through the IR cut filter 307 and is received by the PSD 308. The servo beam may have a wavelength other than 650 nm as long as it can pass through the IR cut filter 307.

When the mirror actuator 100 is driven while a target region is being scanned, the transparent member 200 rotates in association with rotation of the mirror 113. When the transparent member 200 rotates, the travel direction of the servo beam changes, and the irradiation position of the servo beam on the PSD 308 changes. The PSD 308 outputs a position detection signal according to the servo beam reception position.

When the target region is scanned, a laser beam is emitted in a pulse state at a predetermined timing from the laser beam source 401 disposed on the top face of the base 500. A part of the laser beam passes through the opening 500a and enters the servo optical system on the rear face side of the base 500. The laser beam travelling toward the PSD 308 is attenuated by the IR cut filter 307. The power of the laser beam emitted from the laser beam source 401 is conspicuously higher than that of the servo beam incident on the PSD 308 (about 100,000 times). Consequently, the laser beam which enters the servo optical system cannot be completely cut by the IR cut filter 307, and the laser beam enters the PSD 308 as ambient light. The laser beam (ambient light) exerts an influence on an output signal of the PSD 308, and a problem that precision of a position detection signal deteriorates occurs.

In the embodiment, in order to avoid such inconveniences, a circuit configuration for eliminating a disturbance signal generated by the laser beam (ambient light) from the output signal of the PSD 308 is employed. The circuit configuration will be described later with reference to FIGS. 5A, 5B, 6A and 6B.

Figure 4B:
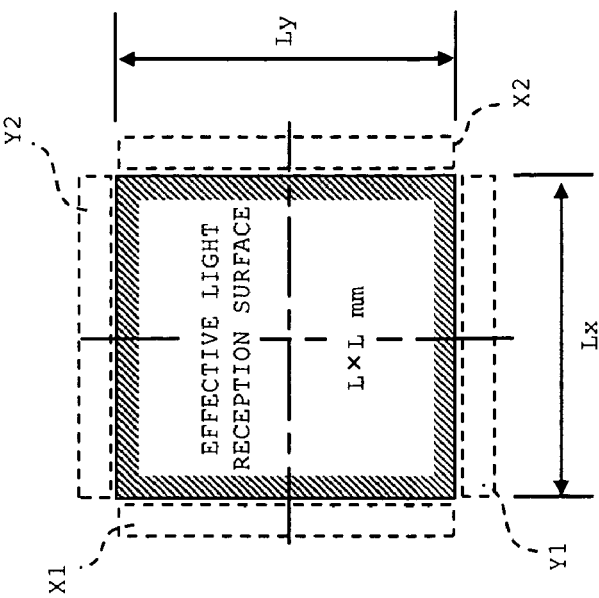
FIGS. 4A and 4B show the configuration of a PSD in the embodiment.
Figure 4A:
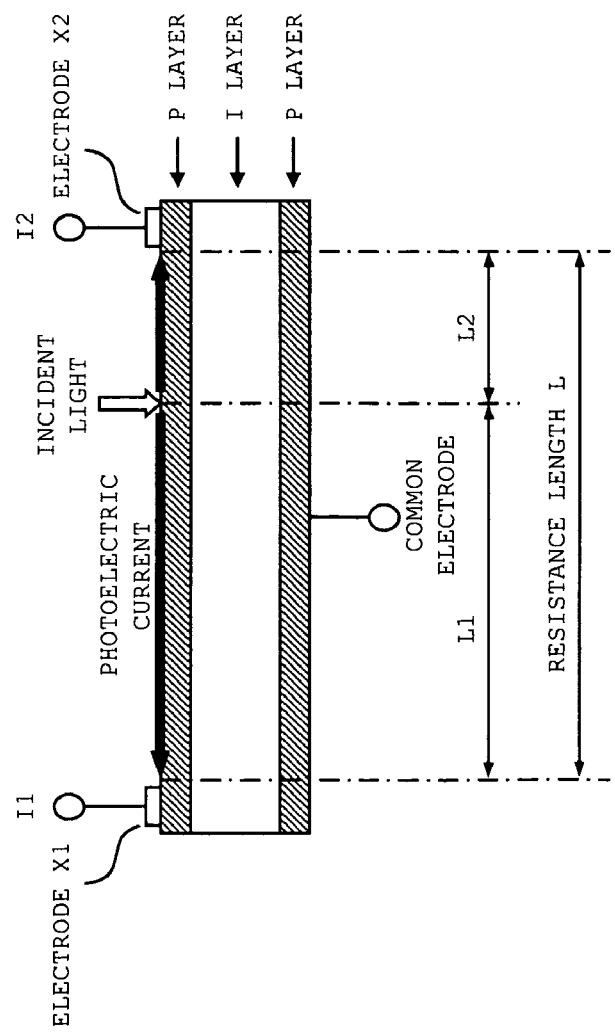

FIG. 4A is a diagram (side cross section) showing the configuration of the PSD 308, and FIG. 4B is a diagram showing the light reception surface of the PSD 308.

Referring to FIG. 4A, the PSD 308 has a structure in which a p-type resistance layer serving as both the light reception surface and a resistance layer is formed on the surface of an N-type high-resistance silicon substrate. On the surface of the resistance layer, electrodes X1 and X2 for outputting photoelectric current in the lateral direction of FIG. 4B and electrodes Y1 and Y2 (not shown in FIG. 4A) for outputting photoelectric current in the vertical direction are formed. On the rear side, a common electrode is formed.

When the light reception surface is irradiated with a laser beam, charges proportional to the light amount are generated in the irradiated position. The charges reach as photoelectric current the resistance layer and are divided in inverse proportion to distance to each of the electrodes, and the resultant currents are output from the electrodes X1, X2, Y1, and Y2. Each of the currents output from the electrodes X1, X2, Y1, and Y2 has a magnitude divided in inverse proportion to the distance from the laser beam irradiation position to the electrode. Therefore, based on values of the currents output from the electrodes X1, X2, Y1, and Y2, the light irradiation position on the light reception surface can be detected.

For example, it is assumed that a position P in FIG. 5A is irradiated with a servo beam. In this case, when amounts of currents output from the electrodes X1, X2, Y1, and Y2 are Ix1, Ix2, Iy1, and Iy2, respectively, and distances between the electrodes in the X and Y directions are Lx and Ly, coordinates (x, y) of the position P using the center of the light reception surface as a reference point are calculated by, for example, the following formulas.

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

FIG. 5B is a diagram showing the configuration of a circuit realizing the formula for computation. The current signals Ix1, Ix2, Iy1, and Iy2 output from the electrodes X1, X2, Y1, and Y2 are amplified by amplifiers 11, 12, 13, and 14, respectively. After that, the current signals Ix1, Ix2, Iy1, and Iy2 are input to an A/D converter 19 through signal removal circuits 15, 16, 17, and 18 and converted to digital signals. The current signals Ix1, Ix2, Iy1, and Iy2 converted as digital signals are input to an arithmetic circuit 20.

The arithmetic circuit 20 is constructed by, for example, an MPU (Micro Processing Unit), computes the left side of the equations (1) and (2) based on the input current signals Ix1, Ix2, Iy1, and Iy2, and generates position detection signals indicative of a position in the X direction (2x/Lx) and a position in the Y direction (2y/Ly) in the servo beam reception position P. The generated position detection signal is output to a DSP (Digital Signal Processor) which will be described later.

In such an arithmetic process, when the laser beam enters the PSD 308 as described above, disturbance occurs in an output signal from the PSD 308 and, due to the disturbance, an error is included in a position detection signal generated by the arithmetic circuit 20.

In the embodiment, to solve such a problem, as shown in FIG. 5B, the signal removal circuits 15, 16, 17, and 18 are disposed at the post stage of the amplifiers 11, 12, 13, and 14, respectively, to remove unnecessary signals (disturbance signals) caused by the laser beam (ambient light) from signals from the amplifiers 11, 12, 13, and 14, respectively.

Figure 6A:
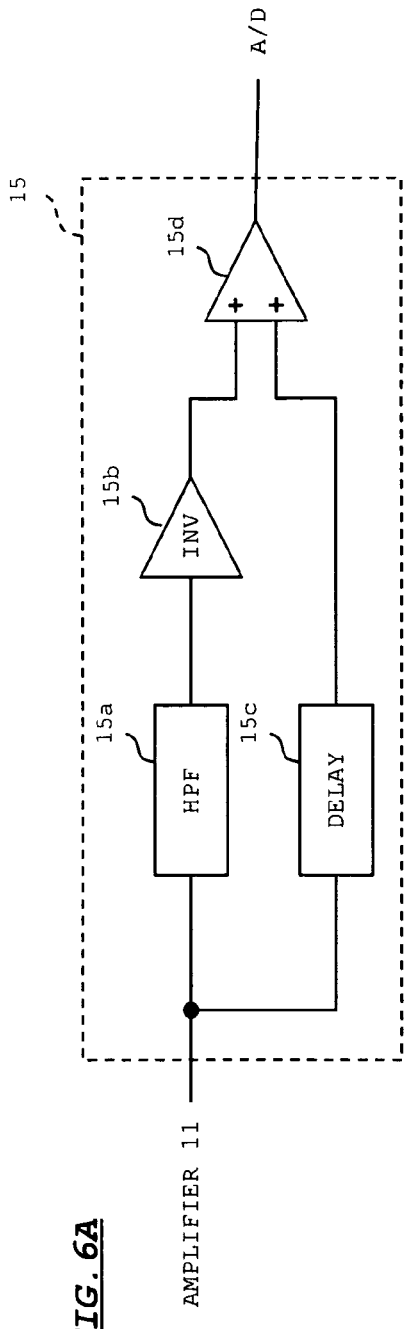
FIGS. 6A and 6B show the configuration of a signal removal circuit in the embodiment.
Figure 6B:
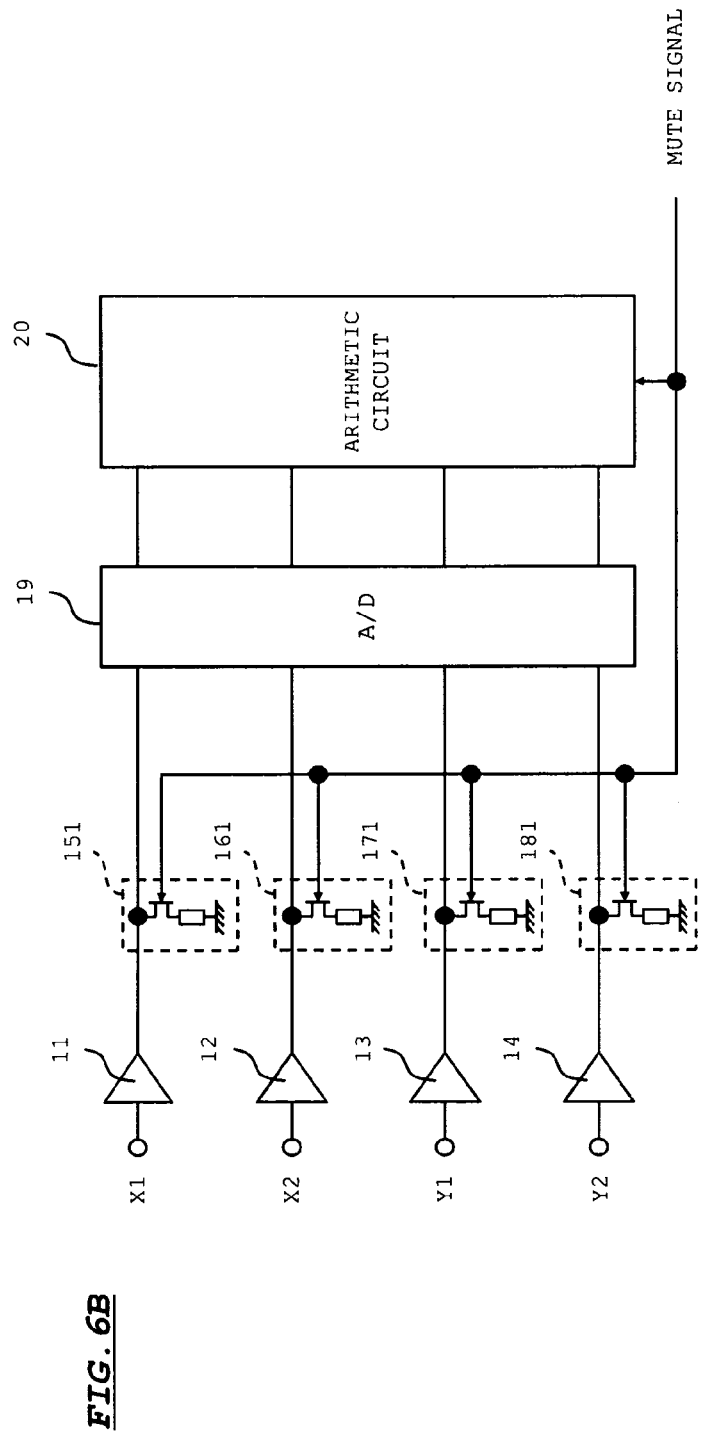

FIGS. 6A and 6B are diagrams showing a configuration example of the signal removal circuits 15, 16, 17, and 18. For convenience, FIG. 6A shows only the configuration of the signal removal circuit 15. Each of the signal removal circuits 16, 17, and 18 has a similar configuration.

Referring to FIG. 6A, the signal removal circuit 15 has an HPF (High Pass Filter) 15a, an inverter 15b, a delay circuit 15c, and an addition circuit 15d. The HPF 15a extracts an unnecessary signal (disturbance signal) generated by the laser beam (ambient light) from an output of the amplifier 11. The inverter 15b inverts the polarity of the extracted disturbance signal. The delay circuit 15c delays a signal output from the amplifier 11 only by time necessary for a process performed by the HPF 15a and the inverter 15b to make the disturbance signal output from the amplifier 11 and the disturbance signal output from the inverter 15b synchronized with each other. The addition circuit 15d adds a signal from the inverter 15b and a signal from the delay circuit 15c.

Figure 7:
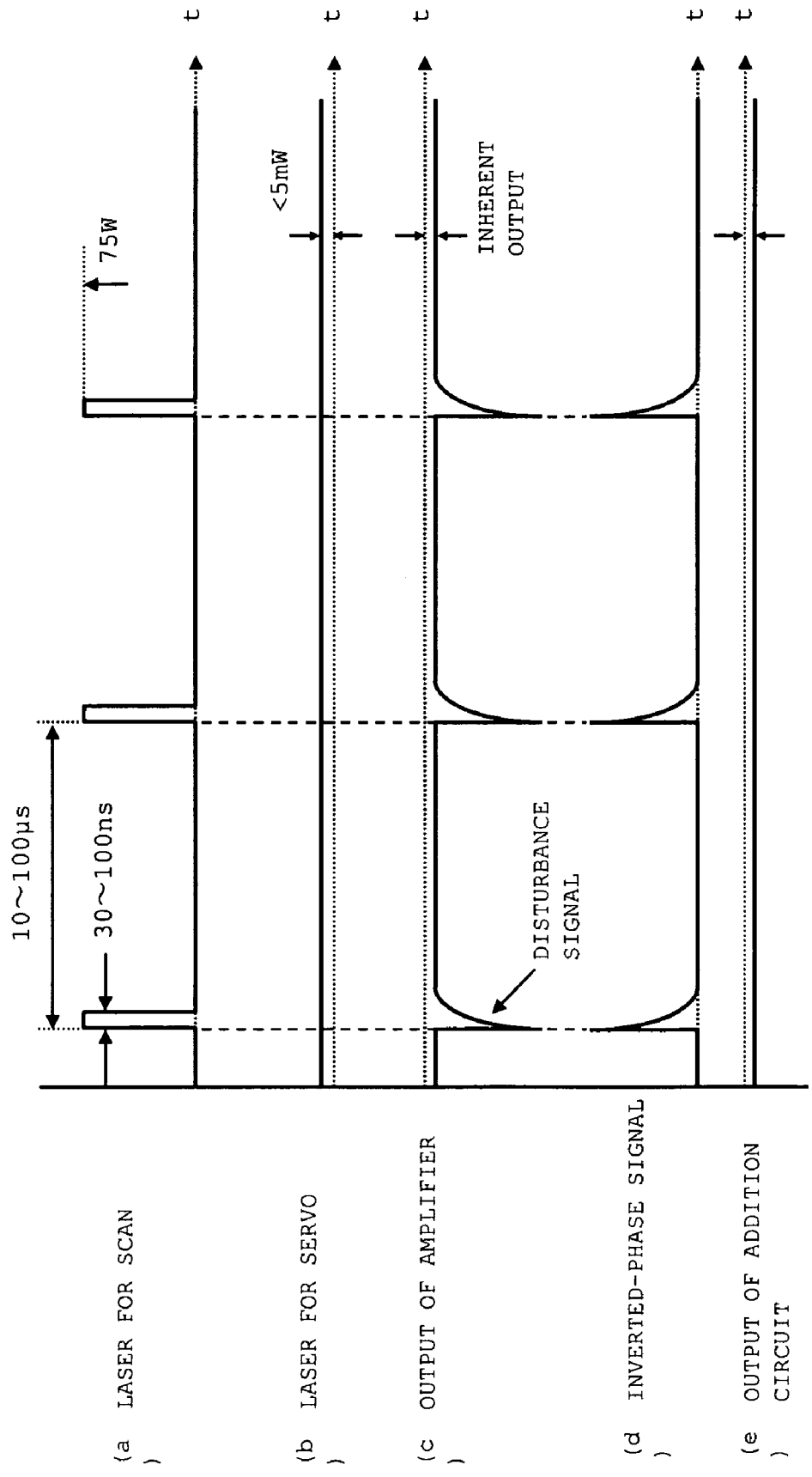
FIG. 7 is a diagram for explaining the action of the signal removal circuit in the embodiment.

FIG. 7 is a diagram for explaining the operation of the signal removal circuit 15 in FIG. 6A.

In FIG. 7, a signal waveform of (a) is of a drive signal to be supplied to the laser beam source 401. A signal waveform of (b) is of a drive signal to be supplied to the semiconductor laser 303. As shown in (a), to the laser beam source 401, a pulse drive signal (75 W) is supplied at a timing of emitting a laser beam to a target region. At this timing, a laser beam of high power is emitted from the laser beam source 401. As shown in (b), to the semiconductor laser 303, a drive signal of a predetermined level (which is set to a value less than 5 mW) is supplied. From the semiconductor laser 303, a servo beam of lower power is emitted constantly.

When the servo beam is emitted, as shown in (c), a signal according to the servo beam irradiation position on the PSD 308 is output from the amplifier 11. The signal is usually at a level according to the power of the servo beam. However, when the laser beam of high power is emitted from the laser beam source 401, a part of the laser beam is incident on the PSD 308. Due to this, as shown in (c), a pulsed disturbance signal appears on the output signal of the amplifier 11.

The disturbance signal is extracted by the HPF 15a shown in FIG. 6A, and the polarity is inverted by the inverter 15b. In FIG. 7, the signal waveform of (d) is of a disturbance signal (inverted-phase signal) obtained by inverting the polarity of the disturbance signal by the inverter 15b. The inverted-phase signal is added to the disturbance signal from the amplifier 11 by the addition circuit 15d. In such a manner, the disturbance signal appearing on the output signal of the amplifier 11 is cancelled and, as a result, a signal shown in (e), that is, a signal according to the servo beam irradiation position on the PSD 308 is output from the addition circuit 15d. By processing the signal by the DSP which will be described later, the position detection signal of high precision can be obtained.

Referring to FIG. 6B, another configuration example of the signal removal circuits 15, 16, 17, and 18 will be described. As shown in the diagram, in the configuration example, mute circuits 151, 161, 171, and 181 are disposed as the signal removal circuits 15, 16, 17, and 18. The mute circuits 151, 161, 171, and 181 mute signals from the amplifiers 11, 12, 13, and 14 in accordance with a mute signal. The mute signal is supplied from the DSP which will be described later to the mute circuits 151, 161, 171, and 181. In the mute period, a signal of the ground level is supplied to the A/D converter 19.

Figure 8:
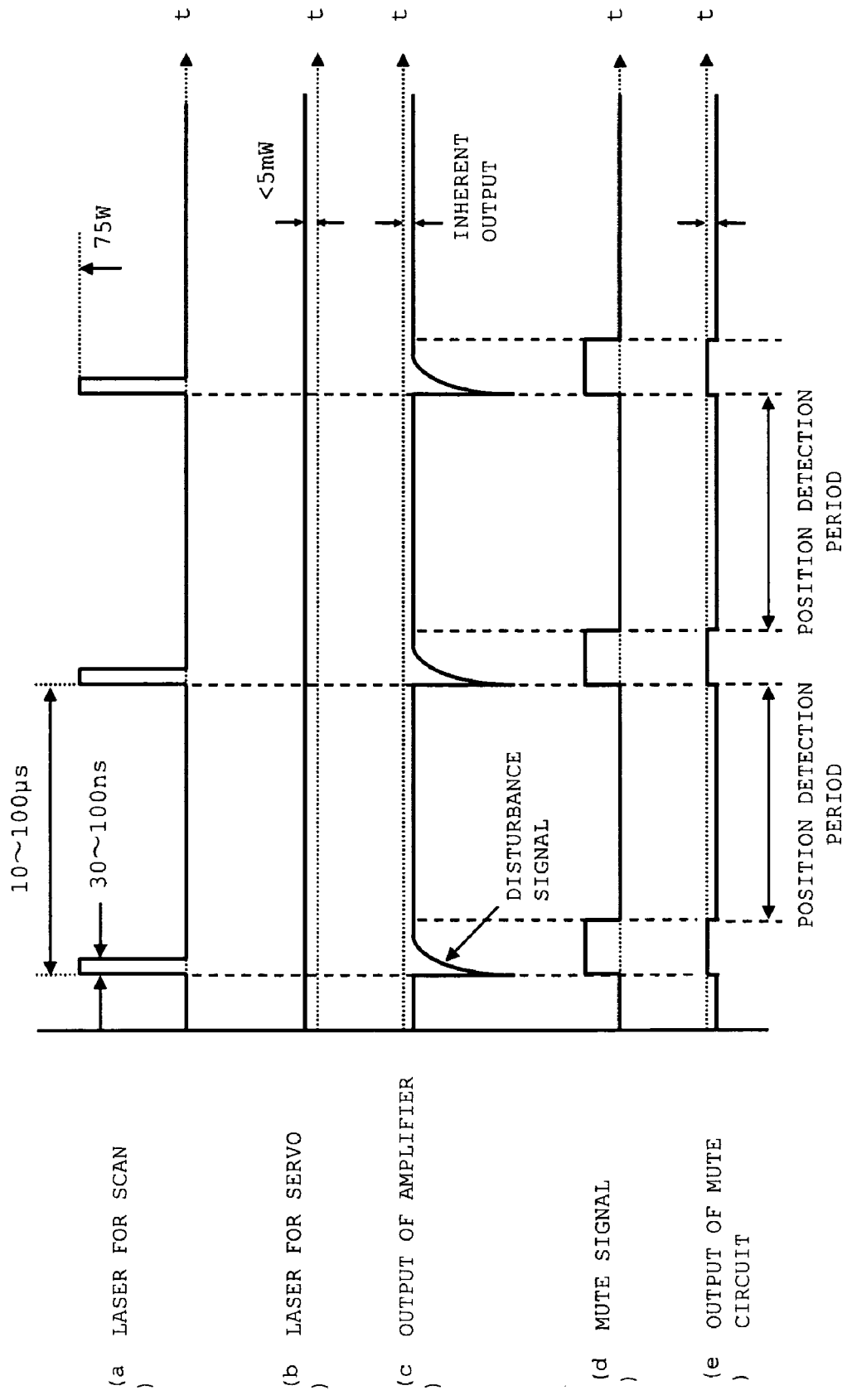
FIG. 8 is a diagram for explaining the action of the signal removal circuit in the embodiment.

FIG. 8 is a diagram for explaining the operation of the mute circuits 151, 161, 171, and 181 in FIG. 6B. In the diagram, signal waveforms of (a) to (c) are similar to those of (a) to (c) in FIG. 7.

To the mute circuits 151, 161, 171, and 181, a mute signal shown in (d) in FIG. 8 is supplied. As shown in the diagram, the mute signal rises at the rising timing of the drive signal of (a) and is supplied to the mute circuits 151, 161, 171, and 181 in a period of covering the disturbance signal of (c). The mute signal supply period is set to be longer than a disturbance signal generation period in consideration of the time constants of the PSD 308 and the amplifiers 11, 12, 13, and 14, and the like. The mute signal supply period is set to a period which can cover even when a disturbance signal generation period changes due to fluctuations in an output of the laser beam source 401, changes with time of the characteristics of the PSD 308 and the amplifiers 11, 12, 13, and 14, and the like.

When the laser beam of high power is emitted from the laser beam source 401 as described above, a part of the laser beam enters the PSD 308, and a pulsed disturbance signal appears on the output signals of the amplifiers 11, 12, 13, and 14. However, the mute signal is supplied in the disturbance signal generation period and the mute circuits 151, 161, 171, and 181 are made active, so that the disturbance signal is eliminated from the signals of the amplifiers 11, 12, 13, and 14. Therefore, a signal shown in (e) in FIG. 8 is output from the mute circuits 151, 161, 171, and 181 and processed by the DSP which will be described later, thereby generating a position detection signal.

Signals output from the mute circuits 151, 161, 171, and 181 are at the ground level in the mute period as shown in (e) in FIG. 8. Consequently, in the mute period, the position detection signal cannot be naturally obtained. The arithmetic circuit 20 is constructed to obtain the position detection signal in a period other than the mute period. To be concrete, in the case where a mute signal is input to the arithmetic circuit 20 and a mute signal is input at a timing of generating the position detection signal, the generation of the position detection signal is skipped.

Figure 9:
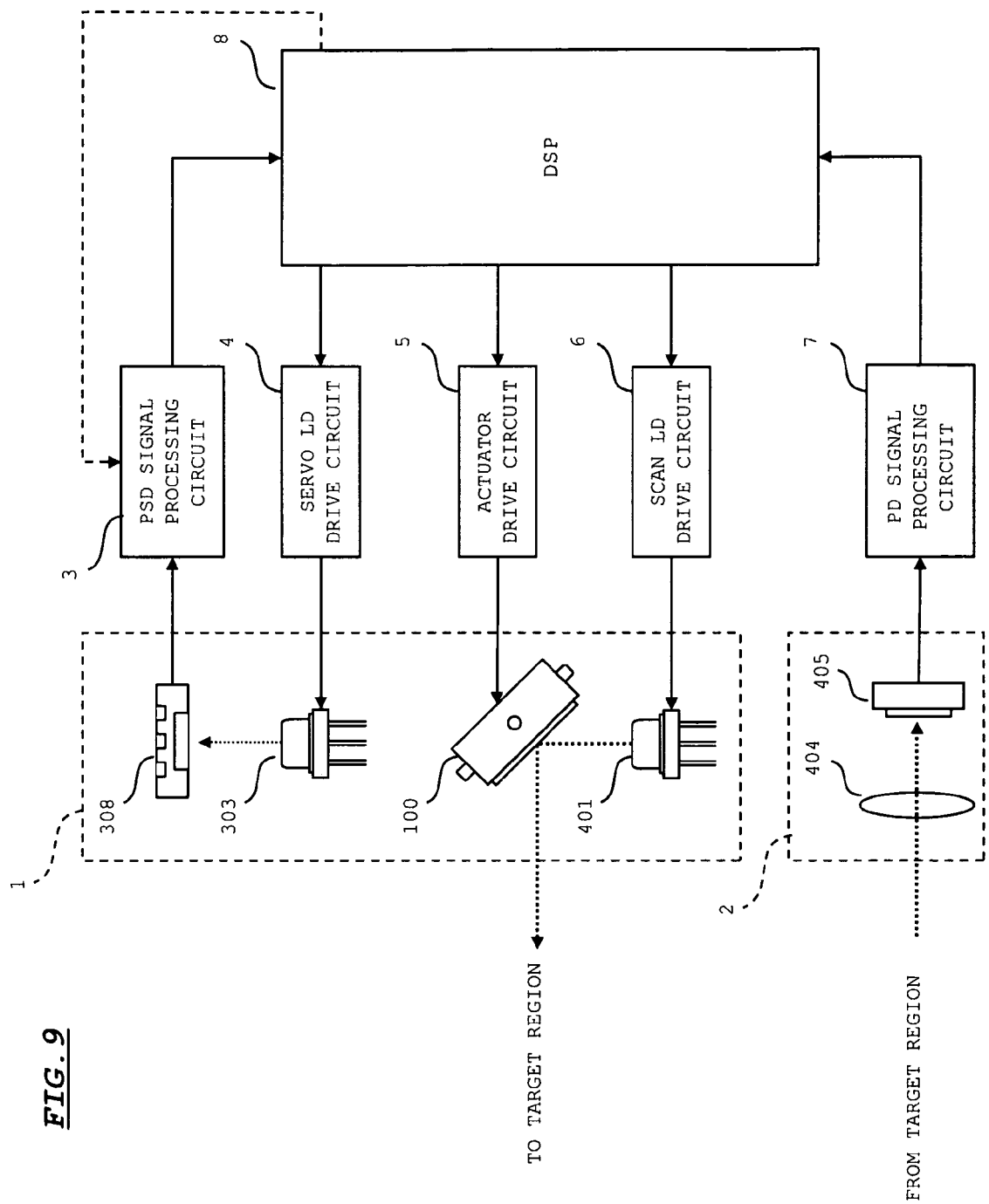
FIG. 9 shows the configuration of a laser radar in the embodiment.

FIG. 9 is a diagram showing the configuration of a laser radar. As shown in the diagram, the laser radar has a beam irradiation head 1, a light reception optical system 2, a PSD signal processing circuit 3, a servo LD drive circuit 4, an actuator drive circuit 5, a scan LD drive circuit 6, a PD signal processing circuit 7, and a DSP 8.

The beam irradiation head 1 has a scan optical system shown in FIG. 2 and a servo optical system shown in FIG. 3. In FIG. 9, for convenience, as the configuration of the beam irradiation head 1, only the laser beam source 401, the mirror actuator 100, the semiconductor laser 303, and the PSD 308 are shown. The light reception optical system 2 has a condenser lens 404 for condensing a laser beam reflected from the target region and a PD (Photo Detector) 405 for receiving the condensed laser beam.

The PSD signal processing circuit 3 has the configuration shown in FIG. 5B and outputs a position detection signal obtained based on the output signal from the PSD 308 to the DSP 8. In the PSD signal processing circuit 3, the signal removal circuits 15, 16, 17, and 18 are disposed as described above. Those circuits have the configuration shown in FIG. 6A or 6B as described above. In the case where the signal removal circuits 15, 16, 17, and 18 have the configuration of FIG. 6B, as described above, the mute signal is supplied from the DSP 8 to the mute circuits 151, 161, 171, and 181 and the arithmetic circuit 20.

The servo LD drive circuit 4 supplies a drive signal to the semiconductor laser 303 based on the signal from the DSP 8. Concretely, a signal shown in (b) in FIG. 7 and a signal shown in (b) in FIG. 8 are supplied to the semiconductor laser 303.

The actuator drive circuit 5 drives the mirror actuator 100 based on the signal from the DSP 8. Concretely, a drive signal for scanning the target region along a predetermined orbit with a laser beam is supplied to the mirror actuator 100.

The scan LD drive circuit 6 supplies a drive signal to the laser beam source 401 based on the signal from the DSP 8. Concretely, a signal shown in (a) in FIG. 7 and a signal shown in (a) in FIG. 8 are supplied to the laser beam source 401.

The PD signal processing circuit 7 amplifies and digitizes a signal from the PD 405 and supplies the resultant signal to the DSP 8.

The DSP 8 detects the laser beam scan position in the target region based on the position detection signal input from the PSD signal processing circuit 3, and executes drive control on the mirror actuator 100, drive control on the laser beam source 401, and the like. The DSP 8 determines whether an obstacle exists in the laser beam irradiation position in the target region or not based on a signal input from the PD signal processing circuit 7. Simultaneously, the DSP 8 measures the distance to the obstacle based on the time difference between the irradiation timing of the laser beam output from the laser beam source 401 and the reception timing of the reflection light from the target region received by the PD 405.

In the case where the signal removal circuits 15, 16, 17, and 18 in the PSD signal processing circuit 3 have the configuration of FIG. 6B, the DSP 8 supplies the mute signal to the mute circuits 151, 161, 171, and 181 in the PSD signal processing circuit 3 and the arithmetic circuit 20 for a predetermined period (mute period) since the timing of inputting the pulse drive signal to the scan LD drive circuit 6. The PSD signal processing circuit 3 mutes the disturbance signal in the mute period and skips generation of the position detection signal in the mute period. In such a manner, the position detection signal which is not influenced by the disturbance signal is supplied from the PSD signal processing circuit 3 to the DSP 8. Therefore, the DSP 8 can perform the operation of detecting an obstacle in the target region, the laser beam irradiation control, and the drive control on the mirror actuator 100 with high precision.

As specifically described above, in the embodiment, by using the configurations shown in FIGS. 6A and 6B, the disturbance signal caused by the laser beam is removed from the output signal from the PSD 308. Consequently, the influence of the laser beam (ambient light) on the position detection signal can be removed. Therefore, deterioration in precision of the position detection signal can be suppressed, and stable scanning operation and obstacle detecting operation can be provided.

The present invention is not limited to the foregoing embodiment and can be variously modified.

For example, in the foregoing embodiment, the servo beam is displaced by the transparent member 200. The servo beam may be also displaced on the PSD 308 by disposing a mirror in place of the transparent member 200 and reflecting the servo beam by the mirror.

In the foregoing embodiment, the semiconductor 303 laser is used as the light source of a servo beam. In place of the semiconductor laser, an LED (Light Emitting Diode) can be used.

Figure 10:
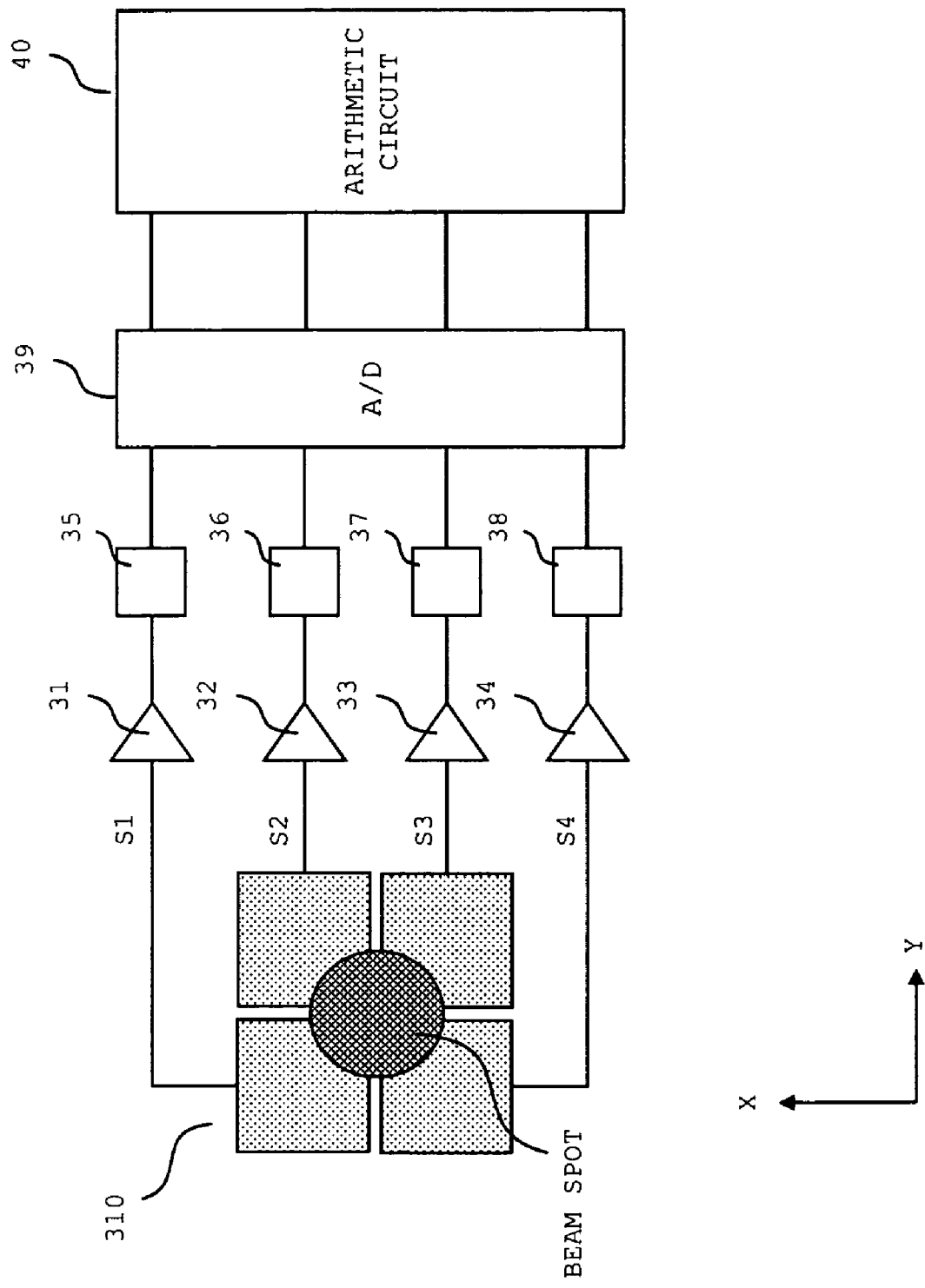
FIG. 10 shows a modification of a position signal generation circuit in the embodiment.

Further, in the foregoing embodiment, the PSD 308 is used as a photodetector for receiving a servo beam. As shown in FIG. 10, a four-division sensor 310 can be also used as the photodetector. In this case, when the mirror 113 is in the neutral position, the servo beam falls on the center position of the four-division sensor 310. When output signals from the sensors are S1, S2, S3, and S4 as shown in the diagram, an X-direction position and a Y-direction position of a beam spot are calculated by, for example, the following formulas.

$$\frac{(S1+S2)-(S3+S4)}{S1+S2+S3+S4} = x \quad (3)$$

$$\frac{(S1+S4)-(S2+S3)}{S1+S2+S3+S4} = y \quad (4)$$

FIG. 10 also shows the configuration of a circuit realizing the computation formulae. Signals S1, S2, S3, and S4 output from the sensors are amplified by amplifiers 31, 32, 33, and 34, respectively. After that, the signals S1, S2, S3, and S4 are input to an A/D converter 39 via signal removal circuits 35, 36, 37, and 38 and converted to digital signals. The signals S1, S2, S3, and S4 converted to digital signals are input to the arithmetic circuit 40.

The arithmetic circuit 40 is constructed by, for example, an MPU, performs computation of the left side of each of the formulae (3) and (4) based on the input signals S1, S2, S3, and S4, and generates position detection signals (outputs x, y) indicative of servo beam reception positions in the X and Y directions. The arithmetic circuit 40 outputs the generated position detection signal to the DSP 8.

Also in such computing process, in a manner similar to the foregoing embodiment, when a laser beam enters the four-division sensor 310, an error is included in the position detection signal generated by the arithmetic circuit 40. Therefore, also in the configuration example, to solve the problem, the signal removal circuits 35, 36, 37, and 38 are disposed at the post stage of the amplifiers 31, 32, 33, and 34, and an unnecessary signal (disturbance signal) caused by the laser beam (ambient light) is removed from the signals output from the amplifiers 31, 32, 33, and 34. The signal removal circuits 35, 36, 37, and 38 can have the configuration similar to that of the signal removal circuits 15, 16, 17, and 18 in the foregoing embodiment.

When the configuration of FIG. 6B is used as the signal removal circuits 15, 16, 17, and 18 in the foregoing embodiment, as shown in (e) in FIG. 8, signals from the signal removal circuits 15, 16, 17, and 18 become the ground level in the mute period. Consequently, in this period, the position detection signal cannot be generated. Due to this, in the foregoing embodiment, in the case where the timing of generating the position detection signal is included in the mute period, the generation of the position detection signal is skipped.

However, in this case, the position detection signal is lost at the time of skip, and there is the possibility that the precision of position detection deteriorates. To avoid such a problem, it is desirable to generate a position detection signal and supply it to the DSP 8 also in this period.

Figure 11:
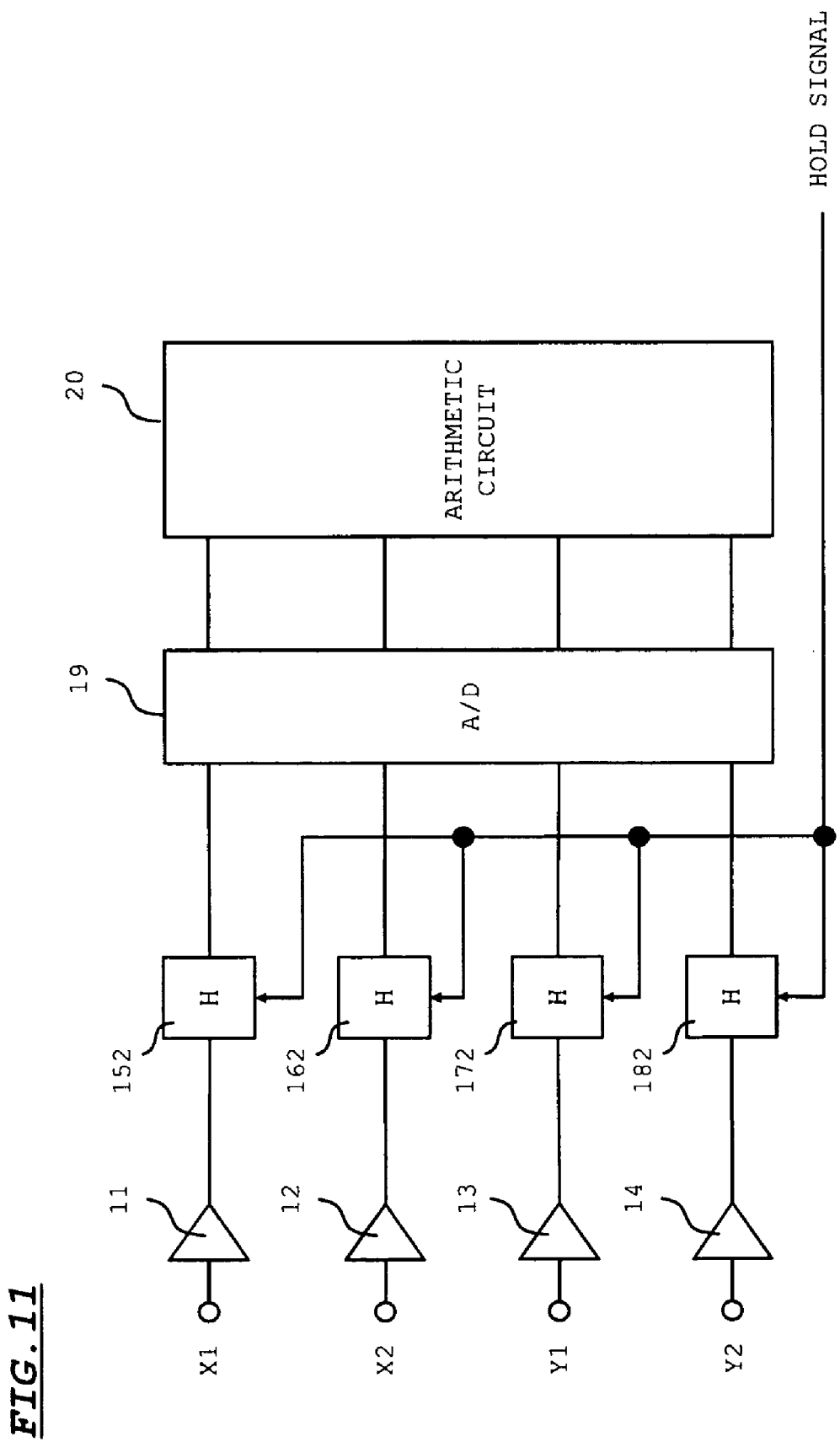
FIG. 11 shows another modification of the position signal generation circuit in the embodiment.

FIG. 11 shows a configuration example for realizing such a request.

In the configuration example, as the signal removal circuits 15, 16, 17, and 18, hold circuits 152, 162, 172, and 182 are used. To the hold circuits 152, 162, 172, and 182, in the disturbance signal generation period, a hold signal is supplied from the DSP 8. When the hold signal is not supplied, the hold circuits 152, 162, 172, and 182 output signals from the amplifiers 11, 12, 13, and 14 as they are to the A/D converter 19. When the hold signal is supplied, the hold circuits 152, 162, 172, and 182 output signals outputted from the amplifiers 11, 12, 13, and 14 just before that to the A/D converter 19.

FIG. 12 is a diagram for explaining the operation of the hold circuits 152, 162, 172, and 182. In the diagram, signal waveforms (a) to (c) are similar to those of (a) to (c) in FIG. 7. In the diagram, a hold signal shown in (d) is a signal similar to the mute signal in FIG. 8.

When a laser beam of high power is emitted from the laser beam source 401, as described above, a pulsed disturbance signal appears on output signals of the amplifiers 11, 12, 13, and 14. In the configuration example, in the disturbance signal generation period, a hold signal (pulse waveform signal) is supplied to the hold circuits 152, 162, 172, and 182. Consequently, in this period, signals output from the amplifiers 11, 12, 13, and 14 just before that are held and then supplied to the A/D converter 19.

Also in the case where the timing of generating the position detection signal is included in the hold signal supply period, like in the other periods, the arithmetic circuit 20 generates the position detection signal based on signals input from the hold circuits 152, 162, 172, and 182 and outputs them to the DSP 8. Therefore, in the configuration example, also in the case where the timing of generating the position detection signal is included in the hold signal supply period, generation of the position detection signal is not skipped but the position detection signal is supplied to the DSP 8 at a regular timing. In this case, a position detection signal is generated based on signals output from the amplifiers 11, 12, 13, and 14 just before that, so that a large error is not included in the generated position detection signal. Therefore, in the configuration example, the precision of detecting a scan position in the DSP 8 can be maintained high, and the precision of scanning a target region with a laser beam and precision of detecting an obstacle can be increased.

In the configuration examples of FIGS. 5B, 6B, 10, and 11, the signal removal circuits 15 to 18 and 35 to 38, mute circuits 151, 161, 171, and 181, and the hold circuits 152, 162, 172, and 182 are disposed at the fore stage of the A/D converters 19 and 39. Alternatively, those circuits may be disposed at the post stage of the A/D converters 19 and 39, and processes in those circuits may be set as digital processes.

The embodiment of the present invention can be properly variously modified in the scope of the technical ideas shown in the scope of claims for patent.

What is claimed is:

1. A beam irradiation apparatus comprising:
   an actuator which scans a target region with a laser beam;
   a photodetector which receives a servo beam and outputs a signal according to a beam reception position;
   an optical unit which makes the servo beam displaced on the photodetector in association with driving of the actuator; and
   a position signal generation circuit which generates a signal according to the reception position of the servo beam based on an output signal from the photodetector,
   wherein the position signal generation circuit has a signal removal circuit that removes a disturbance signal generated when the laser beam is incident on the photodetector, from an output signal of the photodetector.

2. The beam irradiation apparatus according to claim 1, wherein the signal removal circuit comprises:
   a signal extraction circuit which extracts the disturbance signal from an output signal of the photodetector;
   an inverter which inverts polarity of the disturbance signal extracted; and
   an addition circuit which adds the disturbance signal whose polarity is inverted to an output signal from the photodetector.

3. The beam irradiation apparatus according to claim 1, wherein the signal removal circuit comprises:
   a mute circuit which mutes an output signal from the photodetector; and
   a mute control circuit which operates the mute circuit at least in an emission period of the laser beam.

4. The beam irradiation apparatus according to claim 3, wherein the position signal generation circuit generates a signal according to the reception position of the servo beam based on an output signal from the photodetector in a period other than the operation period of the mute circuit.

5. The beam irradiation apparatus according to claim 1, wherein the signal removal circuit has a hold circuit that holds an output signal output from the photodetector just before the laser beam is emitted, at least in the emission period of the laser beam, and
   in the case where a timing of generating a signal according to the reception position of the servo beam is included in a period of generating a disturbance signal, the position signal generation circuit generates a signal according to the reception position of the servo beam based on the output signal held in the hold circuit.

* * * * *